UNITED STATES PATENT OFFICE.

ALEXANDER L. STRAUS, OF BALTIMORE, MARYLAND, ASSIGNOR TO BALTIMORE PROCESS COMPANY, OF BALTIMORE, MARYLAND, A CORPORATION OF DELAWARE.

COMPOSITION OF MATTER.

1,339,528.  Specification of Letters Patent.  Patented May 11, 1920.

No Drawing.  Application filed September 19, 1919. Serial No. 324,924.

*To all whom it may concern:*

Be it known that I, ALEXANDER L. STRAUS, a citizen of the United States, residing at Baltimore, State of Maryland, have invented certain new and useful Improvements in Compositions of Matter; and I do hereby declare the following to be a full, clear, and exact description of the invention, such as will enable others skilled in the art to which it appertains to make and use the same.

This invention relates to compositions of matter especially adapted for adding to the kettle during the operation of boiling out the alcoholic contents of fermented malt and cereal beverages in general in order to restore the original taste and flavor of said beverages, and has for its object to provide a mixture of ingredients which will enable the brewer to boil the alcohol from his beer, and immediately restore the flavor thereof, all in a manner less costly and more expeditious than has been heretofore proposed.

With these and other objects in view the invention consists in the novel mixture of ingredients hereinafter disclosed and particularly pointed out in the claims.

This invention is an improvement over that disclosed in my copending application #314204, filed July 30, 1919, for composition of matter, and in order that the precise invention may be the more clearly understood it is said:—

In my Reissue Patent #14,391, dated Nov. 6, 1917, and entitled Process for making a non-alcoholic beverage, I have described a process of producing a non-alcoholic beer having the same taste as the original beer, and which consists in making beer according to the usual methods, boiling off the alcohol content of the beer, and adding to the beer certain ingredients in specified proportions.

According to the present invention, the same process of making the beer and of boiling it off is carried out, but instead of adding all the ingredients as specified, in said reissue patent, according to this invention, I make a mixture of ingredients specified in said patent, leaving out the hops, which are to be added by the brewer, and I add certain other ingredients as will appear below.

This mixture of ingredients, made the subject of this application, I make up into a package which I ship to the brewer, and instruct him to add a certain portion of its contents to the kettle, say ¾ of an hour before the end of the boiling operation. With this said mixture of ingredients, in the kettle, and with the hops that the brewer himself is to add, the brewer is enabled to produce a non-alcoholic beer having all the original taste of the alcoholic beer as will now appear.

In carrying out this invention, I take say 10 pounds of sodium chlorid, and 10 pounds of gum arabic, or equivalent foam producing material such for example as gum tragacanth or dextrin, and I further provide any suitable sweetening material, but preferably consisting of corn syrup, or of a syrup made from malt, or of a mixture of these syrups, or of one or both of these syrups mixed with cane syrup. I prefer in any case to have present in the sweetening material a substantial portion of malt derived syrup or sugar, for it seems to improve the flavor of the beer; but on the other hand, a syrup derived entirely from sugar cane or from corn, also gives good results. Having decided on the sweetening material I take one pound of potassium meta-bi-sulfite, known to the trade as K. M. S. or kalium meta-bi-sulfite, I take one pound of citric acid, and 2 ounces of lupulim or equivalent bitter tasting material such as tannin or quassia.

In case the tannin is used two ounces thereof will substitute for two ounces of lupulim, but in case quassia is used one-half ounce of the same will serve the same purpose as 2 ounces of lupulim.

To each pound of this mixture of ingredients I next add say 16 pounds, or more or less, of the said sweetening material, according to the particular kind of beer it is desired to make. I next thoroughly mix these ingredients including the syrup and make them up into packages of say 600 pounds or over, which I sell to the brewer, with instructions to add say 4 pounds thereof to his kettle before the end of the boiling operation for each barrel of beer, whereupon, he adds the hops, and such a high quality of beer results that it is difficult to detect in its flavor or taste any difference from the original beer.

I should state that the object of the citric acid is to give a snappy flavor to the beer, without destroying its original flavor, and the object of the lupulim is to enhance the flavor which is restored by the citric acid, and other ingredients. In other words, as is well known, fermented malt and cereal beer or other beverages, including ale, etc., contain a considerable proportion of albumens; these albumens during the boiling operation become cooked, and not only is their flavor thus changed, but the flavor of the other constituents of the beer is likewise changed during the boiling operation.

I have discovered that the addition of the salt, and sugar contained in the above mentioned mixture, together with the hops specified in said reissue patent, will serve in a great measure to restore the original flavor of the beverage. But, when all the other ingredients are added to the beer, just before the end of the boiling operation, I find that it is very difficult indeed, even for experienced beer drinkers to detect the difference in flavor between the non-alcoholic beer and the original beer.

It is of importance that a foam producing material such as gum arabic, be not omitted, for if it is, a gas having an odor will be evolved and the flavor of the beer will be greatly damaged. It is probable, in such cases, the citric acid reacts with the potassium meta-bisulfite, and that the presence of the foam producing material prevents it.

It is obvious that those skilled in the art may vary the proportions as well as the ingredients of my novel mixture, and therefore, I do not wish to be limited to the above disclosure except as may be required by the claims.

What I claim is:—

1. The herein described composition of matter for adding to fermented beverages after a large proportion of their alcoholic contents have been boiled off, in order to restore the taste of the original beverage, the same consisting of a mixture containing sodium chlorid, a foam producing material, more than ten times as much carbohydrate sweetening material as there is sodium chlorid, meta-bi-sulfite of potassium, citric acid sufficient to give a pungent taste, and a bitter tasting material, substantially as described.

2. The herein described composition of matter for adding to fermented beer after substantially all its alcohol has been boiled off, the same containing substantially equal quantities of sodium chlorid, and a foam producing material; more than ten times as much carbohydrate sweetening material added in the form of a syrup as there is sodium chlorid present, and substantially one-tenth as much meta-bi-sulfite of potassium as there is sodium chlorid present; said mixture also containing a bitter tasting material, substantially as described.

3. The herein described composition of matter for adding to fermented malt and cereal beer after substantially all its alcohol has been boiled off in order to restore the taste and flavor of the original beer, the same substantially consisting of the following ingredients in substantially the following proportions: Sodium chlorid 10 pounds, gum arabic, 10 pounds, more than 200 pounds of a syrup a portion of which has been derived from malt; potassium meta-bi-sulfite, one pound; citric acid one pound; lupulim 2 ounces; substantially as described.

4. The herein described composition of matter for adding to fermented malt and cereal beer after substantially all its alcohol has been boiled off in order to restore the taste and flavor of the original beer, the same consisting of the following ingredients in substantially the following proportions: Sodium chlorid 10 pounds; gum arabic 10 pounds; a carbohydrate sweetening material, a substantial portion of which is derived from malt, more than 300 pounds; potassium meta-bi-sulfite, one pound; citric acid one pound; lupulim 2 ounces, substantially as described.

5. The herein described composition of matter for adding to malt and cereal beverages after a large proportion of their alcoholic contents have been boiled off, in order to restore the taste of the original beverage, the same comprising a mixture containing sodium chlorid; a foam producing material; a carbohydrate sweetening material added in the form of a syrup and having a weight more than 20 times that of the sodium chlorid; meta-bi-sulfite of potassium; and a bitter tasting material, substantially as described.

In testimony whereof I affix my signature in presence of a witness.

ALEXANDER L. STRAUS.

Witness:
JULIA B. ROBINSON.